G. J. SEBALD.
UTENSIL GUARD.
APPLICATION FILED NOV. 26, 1919.

1,335,761.

Patented Apr. 6, 1920.

WITNESSES
O. E. Hyde
C. L. Haal

INVENTOR
George J. Sebald
By R. S. Caldwell
ATTORNEY.

UNITED STATES PATENT OFFICE.

GEORGE J. SEBALD, OF MILWAUKEE, WISCONSIN, ASSIGNOR OF ONE-HALF TO ALBERT J. HOLZBAUER, OF MILWAUKEE, WISCONSIN.

UTENSIL-GUARD.

1,335,761.  Specification of Letters Patent.  Patented Apr. 6, 1920.

Application filed November 26, 1919. Serial No. 340,727.

*To all whom it may concern:*

Be it known that I, GEORGE J. SEBALD, a citizen of the United States, and resident of Milwaukee, in the county of Milwaukee and State of Wisconsin, have invented new and useful Improvements in Utensil-Guards, of which the following is a description, reference being had to the accompanying drawings, which are a part of this specification.

The invention relates to cooking utensils and more particularly to coffee-pots, tea-pots, percolators and the like.

Coffee and tea-pots, percolators and the like are usually provided with wooden handles and when used on an open top range it frequently happens that the lower portion of the handle subjected to the high heat of the flame is burned away or weakened to such an extent as to necessitate its renewal. To avoid this difficulty I have provided a very simple but effective heat guard for the handle whereby the heat is deflected away from it.

The invention further consists in the several features hereinafter set forth and more particularly defined by claims at the conclusion hereof.

Figure 1:
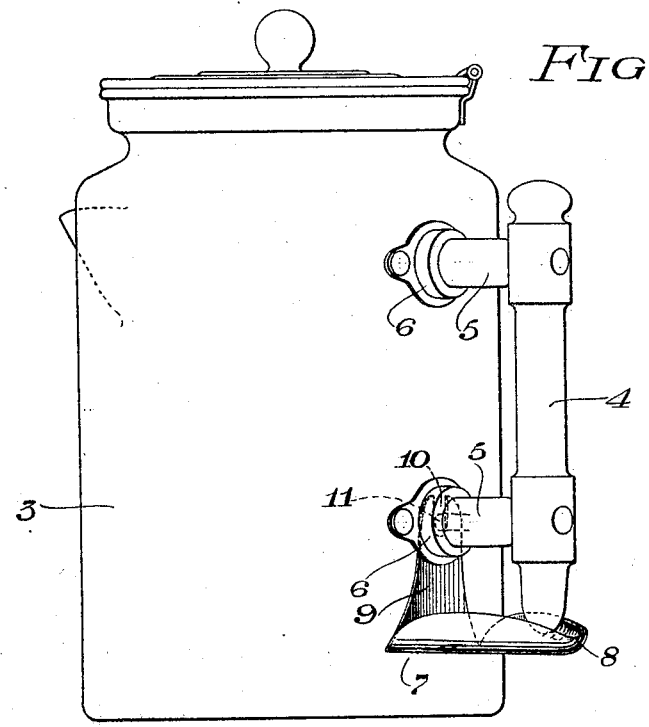
Figure 2:
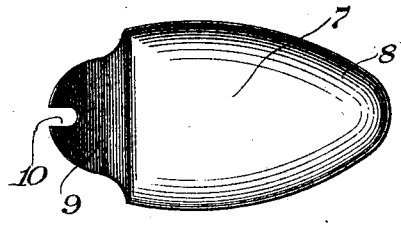
Figure 3:
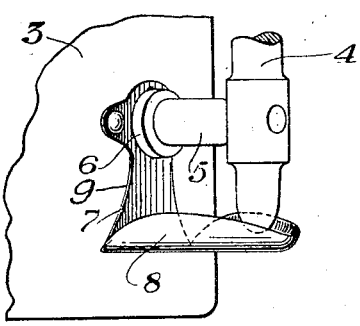

In the drawings: Figure 1 is a perspective view of a utensil showing a device embodying the invention applied thereto. Fig. 2 is a plan view of the device; Fig. 3 is a detail view similar to Fig. 1 showing a slightly modified form of device.

In the drawings the numeral 3 designates a utensil, such as a coffee-pot, provided with a wooden handle 4, the ends 5 of which are secured in metal seats 6 secured to the utensil in any suitable manner, as by riveting.

The lower portion of the wooden handle is frequently subjected to the direct heat from the flame and is burned off or so badly damaged as to necessitate renewal. To prevent this I have provided a guard 7 made of sheet metal and secured to the utensil below the handle. The guard 7 has a heat deflecting portion 8 and an attaching portion 9. The portion 8 is of spoon shaped formation and being disposed beneath and in line with the handle deflects the heat away from it. The guard may be made integral with or form a part of one of the parts secured to the coffee-pot as the seat 6 in Fig. 3, or it may have its attaching portion provided with a slot 10 whereby it may be slipped under the member 6, the slot 10 permitting it to be slipped up past one of the fastening screws 11 forming part of the handle. The spoon-shaped formation of portion 8 efficiently deflects the heat, enables the deflector to be made of thin metal without danger of warping, prevents the deflector catching on objects and eliminates sharp edges which might result in injuries while cleaning or handling the utensil. There are, of course, other ways of forming a detachable connection between the guard and the utensil and the shape of the guard may be varied to accommodate it to different shapes of handles, so that I desire it to be understood that the invention is not limited to any specific form or arrangement of parts except in so far as such limitations are specified in the claims.

What I claim as new and desire to secure by Letters Patent is:

1. The combination, with a utensil provided with a wooden handle, of a metal guard secured to said utensil and having a spoon-shaped portion disposed below and in line with said handle to deflect the heat therefrom.

2. The combination, with a utensil provided with a wooden handle, of a metal guard having a portion detachably secured to the handle and another portion forming a spoon-shaped deflector disposed below and in line with the handle.

In testimony whereof, I affix my signature.

GEORGE J. SEBALD.